United States Patent
Butler

(10) Patent No.: US 10,834,604 B1
(45) Date of Patent: Nov. 10, 2020

(54) WIRELESS BEAMFORMING TO FACILITATE ULTRA RELIABLE LOW LATENCY COMMUNICATION (URLLC) SERVICE

(71) Applicant: Sprint Communications Company L.P., Overland Park, KS (US)

(72) Inventor: Robert Keith Butler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/241,869

(22) Filed: Jan. 7, 2019

(51) Int. Cl.
| | |
|---|---|
| H04W 16/14 | (2009.01) |
| H04W 72/04 | (2009.01) |
| H04W 16/28 | (2009.01) |
| H04W 88/08 | (2009.01) |
| H04W 16/32 | (2009.01) |
| H04W 84/04 | (2009.01) |

(52) U.S. Cl.
CPC ....... *H04W 16/14* (2013.01); *H04W 72/0453* (2013.01); *H04W 16/28* (2013.01); *H04W 16/32* (2013.01); *H04W 84/042* (2013.01); *H04W 88/08* (2013.01)

(58) Field of Classification Search
CPC . H04W 16/14; H04W 72/0453; H04W 16/28; H04W 88/08; H04W 16/32; H04W 84/042
See application file for complete search history.

(56) References Cited

U.S. PATENT DOCUMENTS

| | | | |
|---|---|---|---|
| 2016/0127089 A1* | 5/2016 | Haghighat | H04L 5/0035 370/329 |
| 2018/0049047 A1* | 2/2018 | Lin | H04W 24/02 |
| 2018/0097663 A1 | 4/2018 | Jiang et al. | |
| 2018/0098308 A1 | 4/2018 | Sun et al. | |
| 2018/0206247 A1* | 7/2018 | Sun | H04W 72/085 |
| 2018/0262311 A1* | 9/2018 | Wang | H04L 5/0096 |
| 2018/0278319 A1* | 9/2018 | Cezanne | H04B 7/0695 |
| 2018/0332542 A1* | 11/2018 | Wang | H04L 5/0091 |
| 2019/0238270 A1* | 8/2019 | Pan | H04B 7/0695 |
| 2019/0261197 A1* | 8/2019 | Bellamkonda | H04W 24/04 |
| 2020/0052743 A1* | 2/2020 | Ryu | H04L 5/0048 |
| 2020/0077411 A1* | 3/2020 | Raghavan | H04W 72/046 |

FOREIGN PATENT DOCUMENTS

| | | | |
|---|---|---|---|
| KR | 10-2072307 B1 | * | 9/2018 |
| WO | 2017172985 A1 | | 10/2017 |
| WO | 2018008943 A1 | | 1/2018 |

\* cited by examiner

*Primary Examiner* — Ajay Cattungal

(57) ABSTRACT

A wireless base station serves a wireless network sector over a frequency channel. The wireless base station shares the frequency channel with an Ultra Reliable Low Latency Communication (URLLC) service in a subsector of the wireless network sector. A Fifth Generation (5G) radio beamforms 5G signals over the frequency channel to User Equipment (UEs) that are located in the wireless network sector. The beamforming attenuates the 5G signals below a signal threshold before the 5G signals enter the subsector. A 5G baseband unit determines when UEs enter the subsector. The 5G baseband unit detaches UEs that enter the subsector from the frequency channel.

18 Claims, 9 Drawing Sheets

WIRELESS BEAMFORMING TO FACILITATE ULTRA RELIABLE LOW LATENCY COMMUNICATION (URLLC) SERVICE

TECHNICAL BACKGROUND

Wireless communication networks serve wireless User Equipment (UEs) with mobile data services like voice calling and internet access. The wireless data networks have wireless base stations that exchange data over the air with the wireless UEs. The wireless base stations also exchange the data with wireless network cores. A popular form of wireless networking is Fifth Generation New Radio (5GNR).

5GNR base stations use beamforming to control the shape of wireless signal propagation. The 5GNR base stations adjust the amplitude and phase of the wireless signals per antenna to form radio lobes that have specific shapes and sizes. For example, some antennas transmit in-phase signals to generate a radio lobe in a given direction while other antennas transmit out-of-phase signals to destroy the in-phase signals where the radio lobe is not desired.

5GNR base stations serve 5GNR UEs with Ultra Reliable Low Latency Communications (URLLC) that feature extremely low latency and extremely high reliability. Typically, a 5GNR UE attaches to multiple 5GNR base stations to receive URLLC. In addition, 5GNR URLLC is being deployed for machine-to-machine communications in environments like robotic manufacturing, drone control, and the like. In some cases, the URLLC service uses public spectrum that has a lot of radio interference. In some cases, the URLLC service uses physical shielding to inhibit the radio interference. Unfortunately, 5GNR beamforming has not been effectively integrated with URLLC to effectively and efficiently serve machine-to-machine communications.

Technical Overview

A wireless base station serves a wireless network sector over a frequency channel. The wireless base station shares the frequency channel with an Ultra Reliable Low Latency Communication (URLLC) service in a subsector of the wireless network sector. A Fifth Generation (5G) radio beamforms 5G signals over the frequency channel to User Equipment (UEs) that are located in the wireless network sector. The beamforming attenuates the 5G signals below a signal threshold before the 5G signals enter the subsector. A 5G baseband unit determines when UEs enter the subsector. The 5G baseband unit detaches the UEs that enter the subsector from the frequency channel.

DETAILED DESCRIPTION

Figure 1:
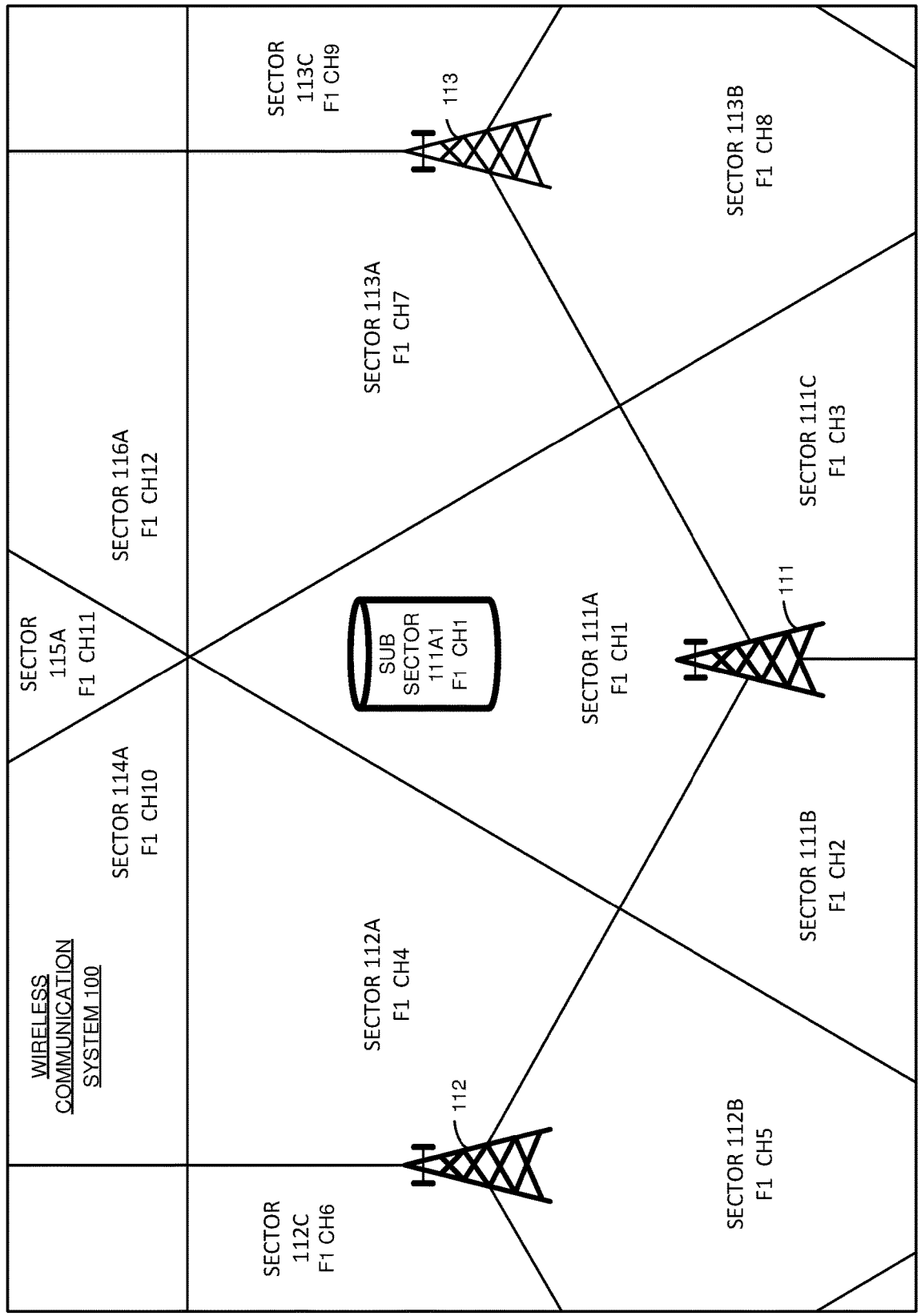
FIG. 1 illustrates a wireless communication system that serves a wireless network sector over a frequency channel to facilitate a wireless Ultra-Reliable Low Latency Communication (URLLC) service over the frequency channel in a subsector of the wireless network sector.

FIG. 1 illustrates wireless communication system 100 that serves wireless network sector 111A over Frequency Band One (F1) Channel One (CH1) to facilitate a wireless Ultra-Reliable Low Latency Communication (URLLC) service over F1 CH1 in subsector 111A1. Wireless communication system 100 comprises wireless base stations 111-113. Wireless base station 111 serves User Equipment (UEs) in wireless networks sectors 111A, 111B, and 111C over respective F1 channels 1, 2, and 3. Wireless base station 112 serves UEs in respective wireless networks sectors 112A, 112B, and 112C over respective F1 channels 4, 5, and 6. Wireless base station 113 serves UEs in respective wireless networks sectors 113A, 113B, and 113C over respective F1 channels 7, 8, and 9. Wireless network sectors 114A, 115A, and 116A use respective F1 channels 10, 11, and 12.

The frequency band F1 and CH1 comprise private spectrum that is licensed from the Federal Communication Commission (FCC). Thus, F1 and CH1 are clean for the URLLC service given FCC rules and the beamforming performed by wireless base station 111. CH1 could have various spectral widths. Exemplary frequency channels comprise frequency bands that are between 10 megahertz and 100 megahertz wide. For example, CH1 could be a 20 megahertz band near 2 gigahertz.

Wireless network sector 111A contains subsector 111A1 that also uses F1 CH1. Wireless network subsector 111A1 has its own URLLC network that uses F1 CH1 to provide URLLC service in subsector 111A1. Subsector 111A1 may comprise a two-dimensional geographic area on the earth's surface. Subsector 111A1 may also comprise a three-dimensional geographic area on or above the earth's surface.

Wireless base stations 111-113 could be Fifth Generation New Radio (5GNR) gNodeBs, Institute of Electrical and Electronic Engineers 802.11 (WIFI) hotspots, and/or the like. Wireless base stations 111-113 comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, software, and transceivers. In the baseband circuitry, the processing circuitry executes operating systems and network applications that are stored in the memory circuitry.

The UEs could be phones, computers, robots, machine controllers, displays, headsets, or some other user apparatus that uses Fifth Generation New Radio (5GNR), Institute of Electrical and Electronic Engineers 802.11 (WIFI), or some other wireless network protocol. The UEs comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

Wireless base stations 111-113 are coupled to a 5G network core or some other type of networking data center. The network core comprises 5G network elements like Access and Mobility Management Function (AMF), Authentication Server Function (AUSF), Unified Data Management (UDM), Session Management Function (SMF), User Plane Function (UPF), Policy Control Functions (PCF), Application Functions (AF), Network Repository Function (NRF), Network Slice Selection Function (NSSF), Network Exposure Function (NEF), and the like. The network core comprises processing circuitry, memory circuitry, bus circuitry, transceivers and software. The processing circuitry executes operating systems and the network element software that are stored in the memory circuitry. In some examples, subsector 111A1 has its own URLLC network core.

In subsector 111A, wireless user devices use frequency band F1 CH1 for URLLC service. For example, manufacturing robots and machine controllers may communicate over F1 CH1 in subsector 111A1 with extremely high reliability and extremely low latency. Wireless base station 111 does not serve UEs in subsector 111A1 over F1 CH1. Wireless base station 111 determines when individual UEs enter subsector 111A1, and in response, wireless base station 111 detaches these UEs from F1 CH1. The detached UEs may still use subsector 111A1 if allowed by subsector 111A1. The detached UEs may still use other frequency bands or channels for wireless communications. Wireless base station 111 beamforms to attenuate F1 CH1 signals before they enter subsector 111A1. The beamforming generates radio lobes that approach and go around subsector 111A1.

The URLLC network in subsector 111A1 may wirelessly transfer a URLLC start signal to wireless base station 111. In response to the URLLC start signal, wireless base station 111 starts beamforming 5GNR signals to avoid subsector 111A1 and starts detaching UEs that enter subsector 111A1 from F1 CH1. The URLLC network in subsector 111A1 may then wirelessly transfer a URLLC stop signal to wireless base station 111. In response to the URLLC stop signal, wireless base station 111 stops beamforming 5GNR signals to avoid subsector 111A1 and stops detaching UEs that enter subsector 111A1. Thus, wireless base station 111 starts serving UEs in subsector 111A1 over F1 CH1.

Figure 2:
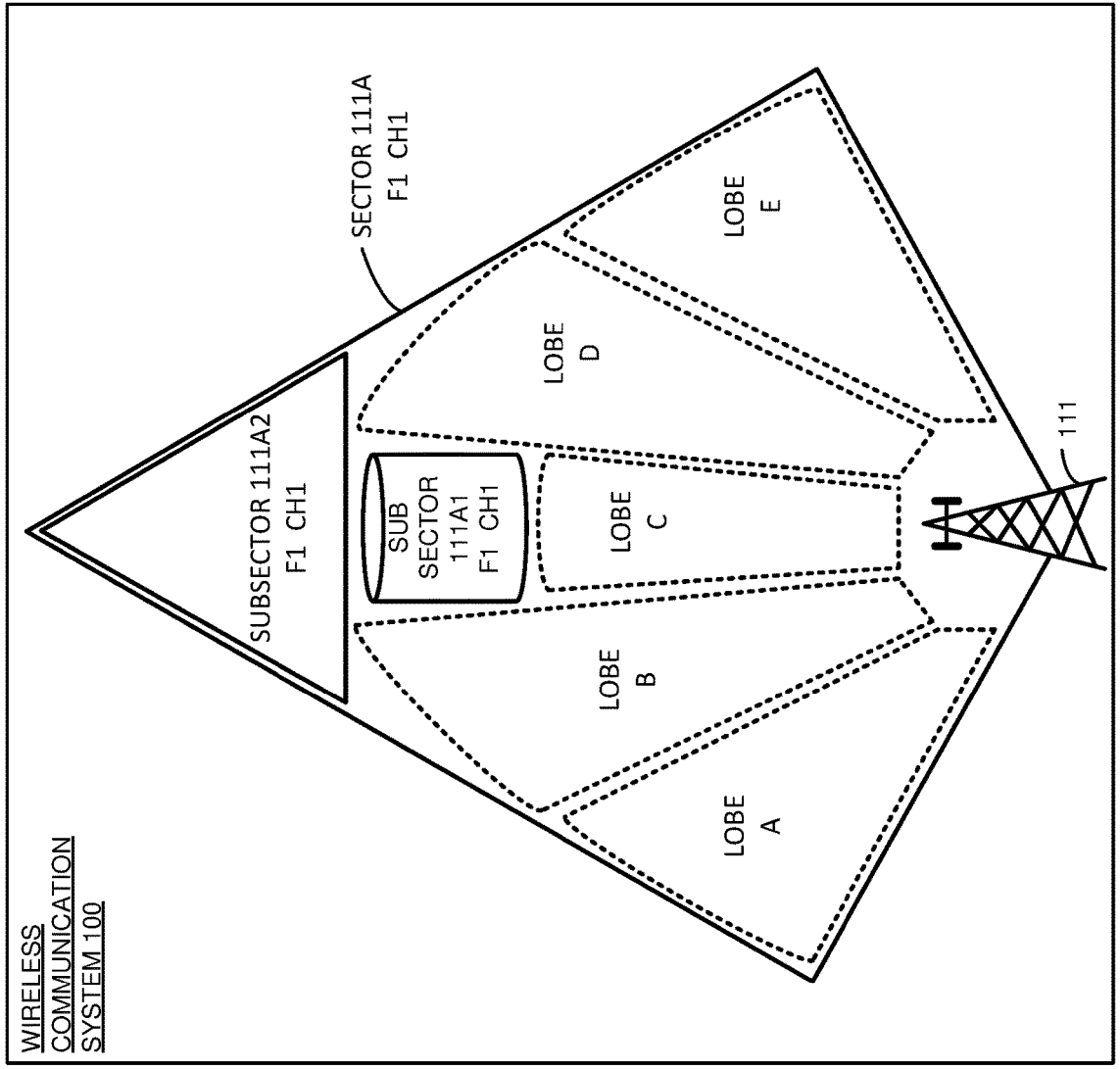
FIG. 2 illustrates the wireless communication sector that uses the frequency channel and facilitates the wireless URLLC service in the subsector.

FIG. 2 illustrates wireless communication sector 111A that uses F1 CH1 to facilitate wireless URLLC services over F1 CH1 in subsector 111A1. In wireless communication system 100, wireless base station 111 beamforms 5GNR signals to generate radio lobes A, B, C, D, and E. Note that the number and shape of the lobes has been simplified for clarity and will vary. Radio lobe C approaches but stops short of subsector 111A1. Radio lobes B and D propagate along the sides of subsector 111A1. Another subsector 111A2 with its own wireless base station is added to serve the far point of the sector 111 over F1 CH1. Typically, network sector 111 and subsector 111A2 are served by the same 5G core.

Figure 3:
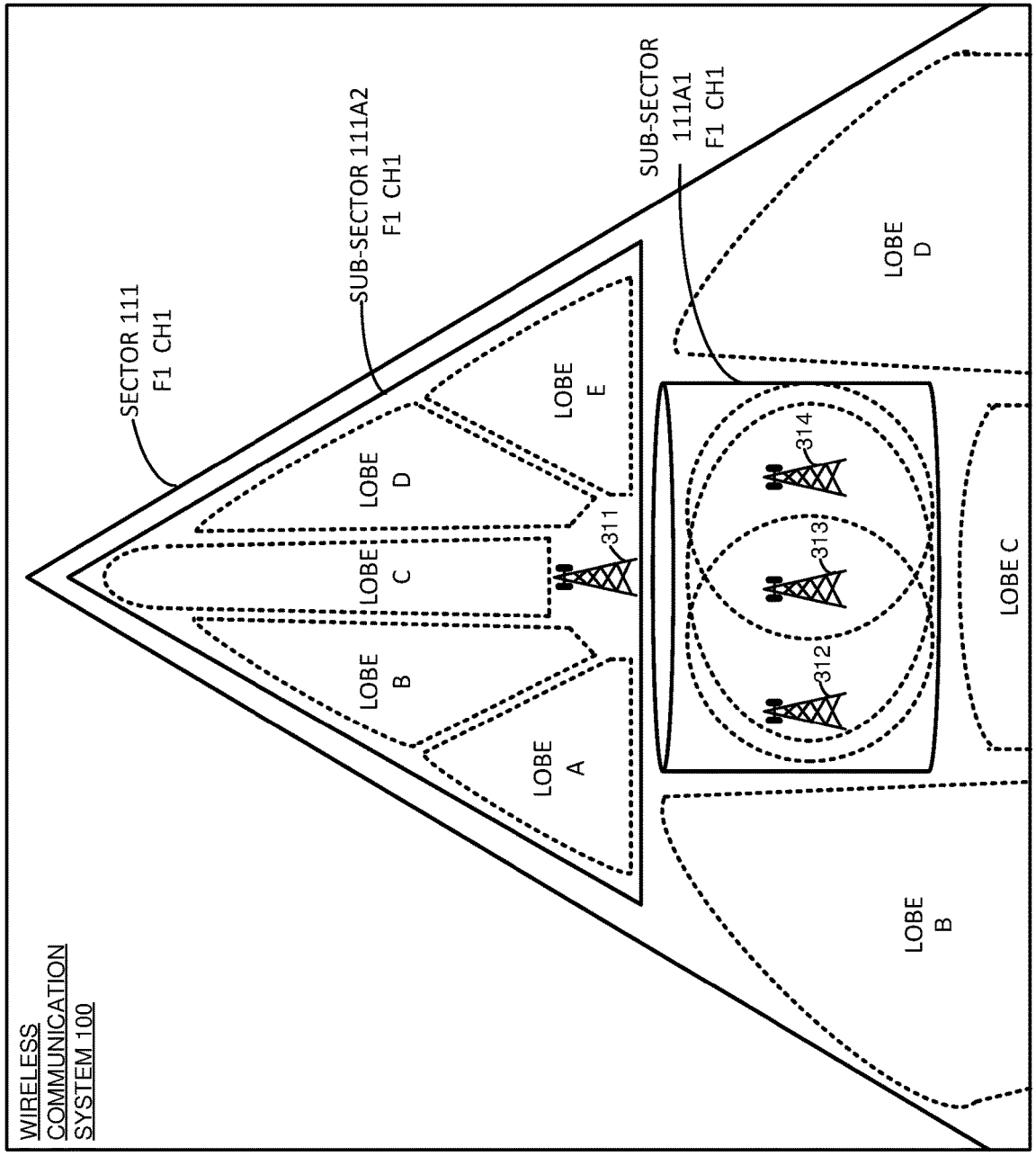
FIG. 3 illustrates subsectors that use the frequency channel and facilitate the wireless URLLC service in some of the subsectors.

FIG. 3 illustrates subsectors 111A1 and 111A2 that use F1 CH1 to facilitate wireless URLLC service in subsector 111A1. In wireless communication system 100, subsector 111A2 comprises wireless base station 311, and subsector 111A1 comprises wireless base stations 312-314. In sub sector 111A2, wireless base station 311 beamforms 5GNR signals to generate radio lobes A, B, C, D, and E that avoid subsector 111A1. In subsector 111A1, wireless base stations 312-314 beamform 5GNR signals to generate overlapping that avoid the remainder of network sector 111A. URLLC networks have overlapping radio coverage, and UEs simultaneously attach to multiple base stations 312-324 for extremely high reliability. The URLLC networks typically have a local URLLC network core for extremely low latency.

Figure 4:
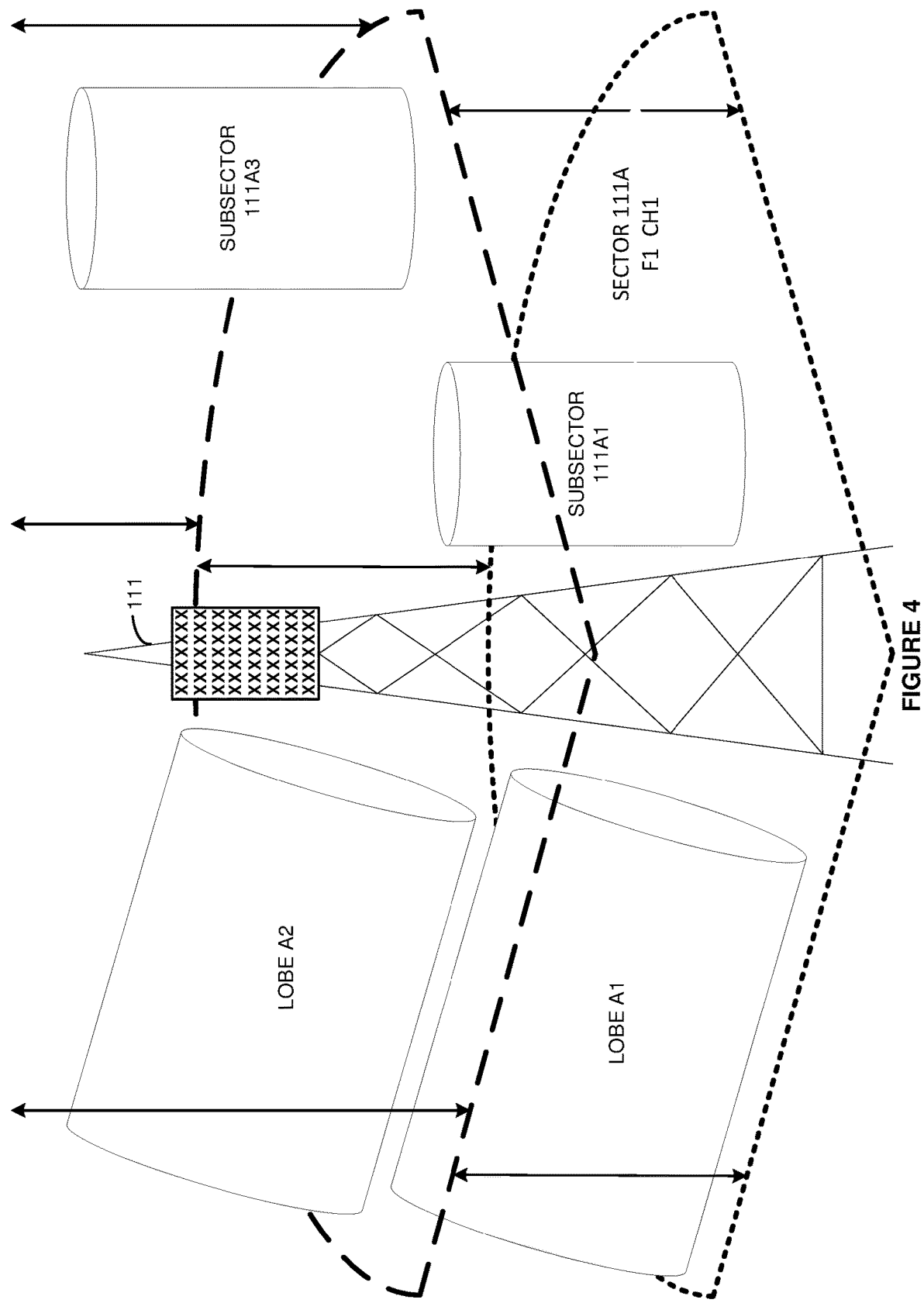
FIG. 4 illustrates a three dimensional lobes to facilitate the wireless URLLC service over the frequency channel in three-dimensional subsectors.

FIG. 4 illustrates three dimensional lobes A1 and A2 to facilitate wireless URLLC service over F1 CH1 in three-dimensional subsectors 111A1 and 111A3. For clarity, not all radio lobes and subsectors are shown but additional lobes would cover sector 111A at multiple elevations and avoid subsectors 111A1 and 111A3. The number and shape of the three-dimensional lobes has been simplified for clarity and will vary.

By using a massive antenna array, wireless base station 111 performs both horizontal and vertical beamforming. Thus, wireless base station 111 generates three-dimensional lobes that have upper and lower elevations. Radio lobe A1 is directly below radio lobe A2 and both extend from wireless base station 111 to the edge of network sector 111A. Note that subsector 111A1 does not extend up to the elevation of lobe A2, so wireless base station 111 can generate a radio lobe that propagates above subsector 111A1 to the far point of sector 111A. Another URLLC subsector 111A3 is shown at elevation. Wireless base station 111 facilitates URLLC services in subsector 111A3 like it does for subsector 111A1. Note that subsector 111A3 does not extend below the elevation of lobe A2, so wireless base station 111 can generate a radio lobe the propagates below subsector 111A1 to the far point of sector 111A.

Figure 5:
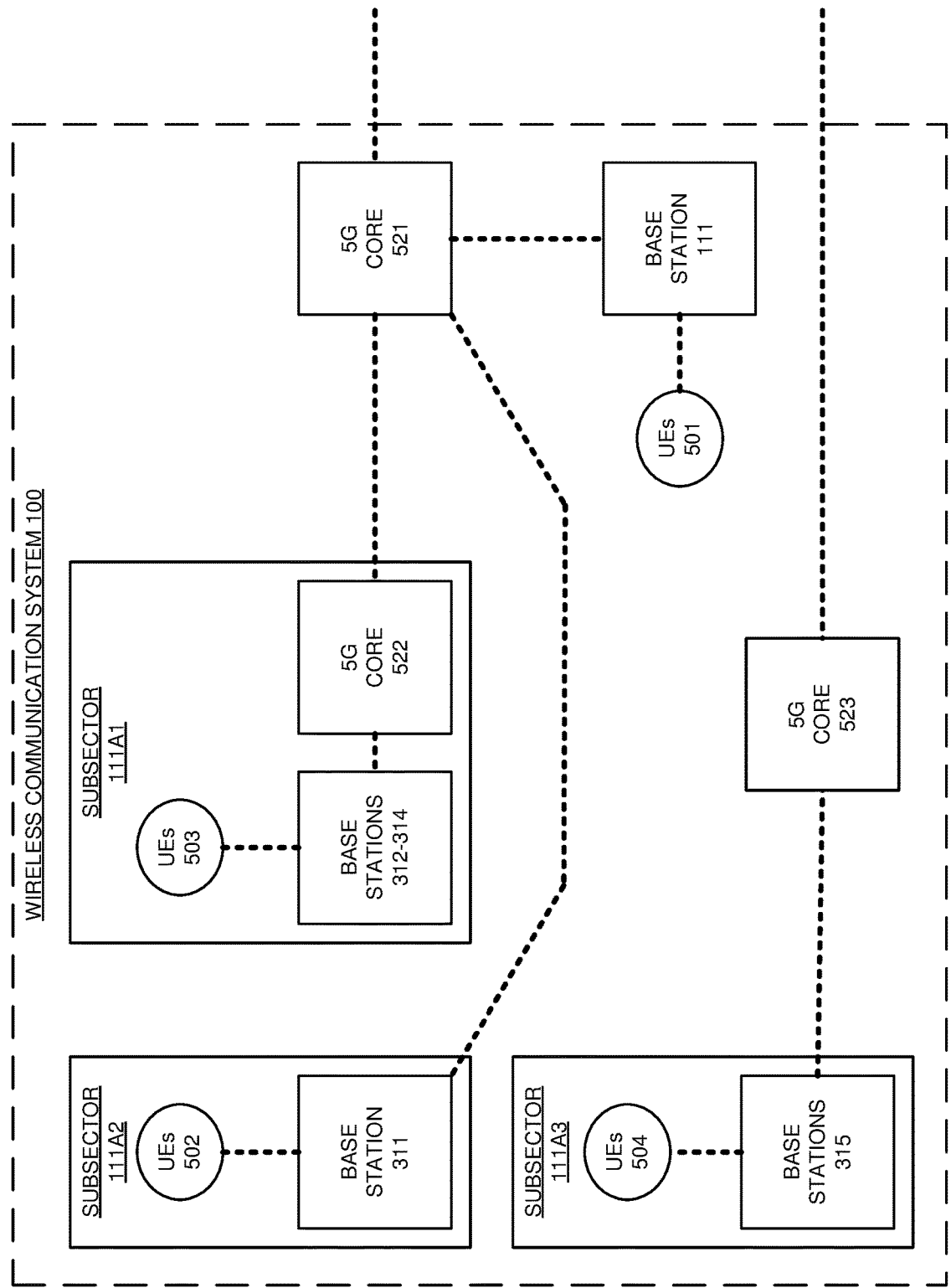
FIG. 5 illustrates the wireless communication system that serves the wireless network sector over the frequency channel and facilitates wireless URLLC service over the frequency channel in the subsector.

FIG. 5 illustrates wireless communication system 100 that serves wireless network sector 111 over the frequency F1 CH1 to facilitate wireless URLLC service over F1 CH1 in subsectors 111A1 and 111A3. Wireless communication system 100 comprises wireless base stations 111 and 311-315 and 5G cores 521-523. 5G core 521 is coupled to wireless base station 111, wireless base station 311, and 5G core 522. 5G core 522 is coupled to wireless base stations 312-314 and 5G core 521. 5G core 523 is coupled to wireless base stations 315. Wireless base stations 111 and 311 serve UEs 501-502 with services like internet access, video streaming, and voice calling in sector 111A and subsector 111A2. Wireless base stations 312-315 serve UEs 503-504 with URLLC services in subsectors 111A1 and 111A3.

UEs 503-504 use frequency band F1 CH1 for URLLC service. For example, manufacturing robots and machine controllers may communicate over F1 CH1 in subsector 111A1 with extremely high reliability and extremely low latency. Airborne drones may communicate over F1 CH1 in elevated subsector 111A3 with extremely high reliability and extremely low latency.

Wireless base stations 111 and 311 do not serve UEs 503-504 in subsectors 111A1 and 111A3 over F1 CH1. Wireless base stations 111 and 311 determine when individual UEs enter subsectors 111A1 and 111A3, and in response, wireless base stations 111 and 311 detach these UEs from F1 CH1. The detached UEs may use subsectors 111A1 and 111A3 if allowed by subsectors 111A1 and 111A3. The detached UEs may use other frequency bands or channels for wireless communications. Wireless base stations 111 and 311 beamform to attenuate F1 CH1 signals before they enter subsectors 111A1 and 111A3. The beamforming generates radio lobes that approach and go around subsectors 111A1 and 111A3. Subsectors like subsector 111A2 are added to cover radio holes caused by the beamforming performed by wireless base station 111.

Figure 6:
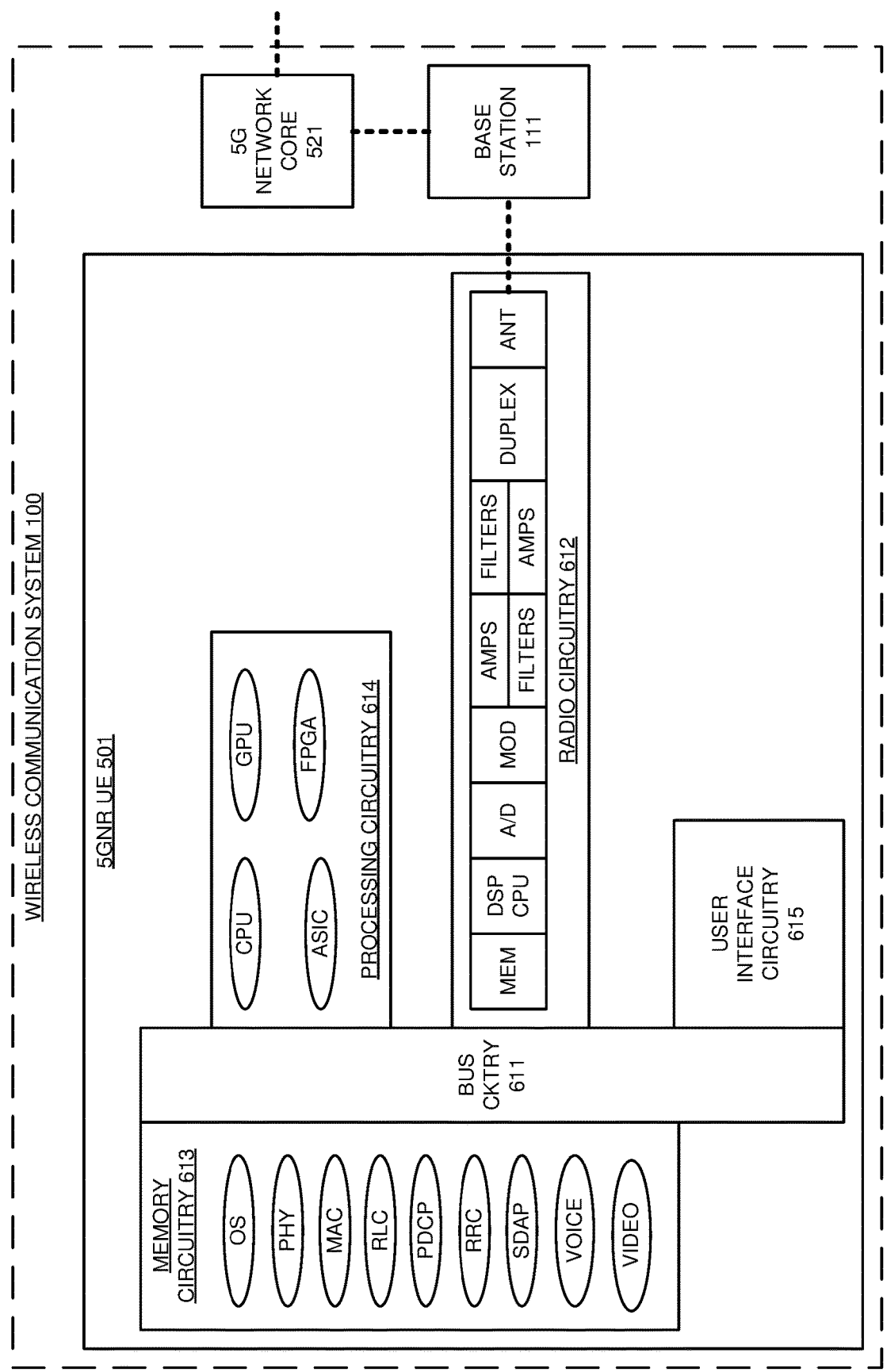
FIG. 6 illustrates 5GNR User Equipment (UE) that uses the frequency channel and facilitates wireless URLLC service in the subsector.

FIG. 6 illustrates 5GNR UE 501 that uses F1 CH1 in sector 111A. UEs 502-504 could be similar to UE 501 although UEs 502-504 may differ. 5GNR UE 501 comprises bus circuitry 611, radio circuitry 612, memory circuitry 613, processing circuitry 614, and user interface circuitry 615. Bus circuitry 611 couples radio circuitry 612, memory circuitry 613, processing circuitry 614, and user interface circuitry 615. Memory circuitry 613 comprises volatile and non-volatile memories like flash, disc, tape, and the like. Memory circuitry 613 stores operating systems, network applications, user applications, and the shared secret key. Processing circuitry 614 comprises CPUs, GPUs, ASICs, FPGAs and/or some other computer hardware. Processing circuitry 614 executes the operating systems, network applications, and user applications to drive radio circuitry 612 and user interface circuitry 615. User interface circuitry 615 comprises displays, speakers, microphones, transceivers, ports, and/or some other user component.

Radio circuitry 612 comprises antennas (ANT), duplexers (DUPLEX), filters, amplifiers (AMPS), modulators (MOD), analog/digital interfaces (A/D), Digital Signal Processors (DSP), Central Processing Units (CPU), and memory (MEM). The antennas in radio circuitry 612 exchange wireless data and signaling with wireless base station 111. The antennas in radio circuitry 612 may comprise an antenna array, and like wireless base station 111, 5GNR UE 501 may drive the antenna array to beamform UE transmissions to avoid subsector 111A1 and mitigate F1 CH1 interference caused by UE 501 in subsector 111A1. In other examples. 5GNR UE 501 may drive the antenna array to beamform the UE transmissions to remain within subsector 111A1 and mitigate F1 CH1 interference caused by UE 501 in wireless network sector 111A.

The DSP/CPUs execute firmware/software to drive the exchange of the data and signaling between the antennas and the radio memory. Processing circuitry 614 executes the operating systems and network applications to drive the exchange of data and signaling between the radio memory and memory circuitry 613. Processing circuitry 614 executes user applications to drive the exchange of data between memory circuitry 613 and user interface circuitry 615. User interface circuitry 615 exchanges the data with the user. In some examples, user interface circuitry 615 is omitted. In some examples, 5GNR UE 501 is integrated within a robot, drone, vehicle, and the like.

The user applications generate UL data. The network applications generate signaling transfer the UL data and signaling from memory circuitry 613 to the radio memory. In radio circuitry 612, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to wireless base station 111.

In radio circuitry 612, the antennas receive wireless Downlink (DL) signals from 5GNR access point 111 and transfer corresponding electrical DL signals through the duplexers to the amplifiers. In many cases, the DL signals are beamformed to avoid specific sectors and subsectors. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs store the DL data and signaling in the radio memory. Processing circuitry 614 transfers the recovered DL data and signaling to memory circuitry 613. The network applications process the DL data and signaling in memory circuitry 613. The user applications process the DL data.

The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and Quality-of-Service (QoS). The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC interacts with wireless network controllers like Access and Mobility Functions (AMFs) to establish and terminate data sessions. The RRC supports N1 messaging with the AMFs. The RRC handles security and key management, handover operations, status reporting, QoS, system broadcasts, and network pages. The SDAP exchanges S3 data with User Plane Functions (UPFs) under the control of Session Management Functions (SMFs). The SDAP maps between the SDUs and the QoS flows and mark the QoS flows with the proper QoS.

Figure 7:
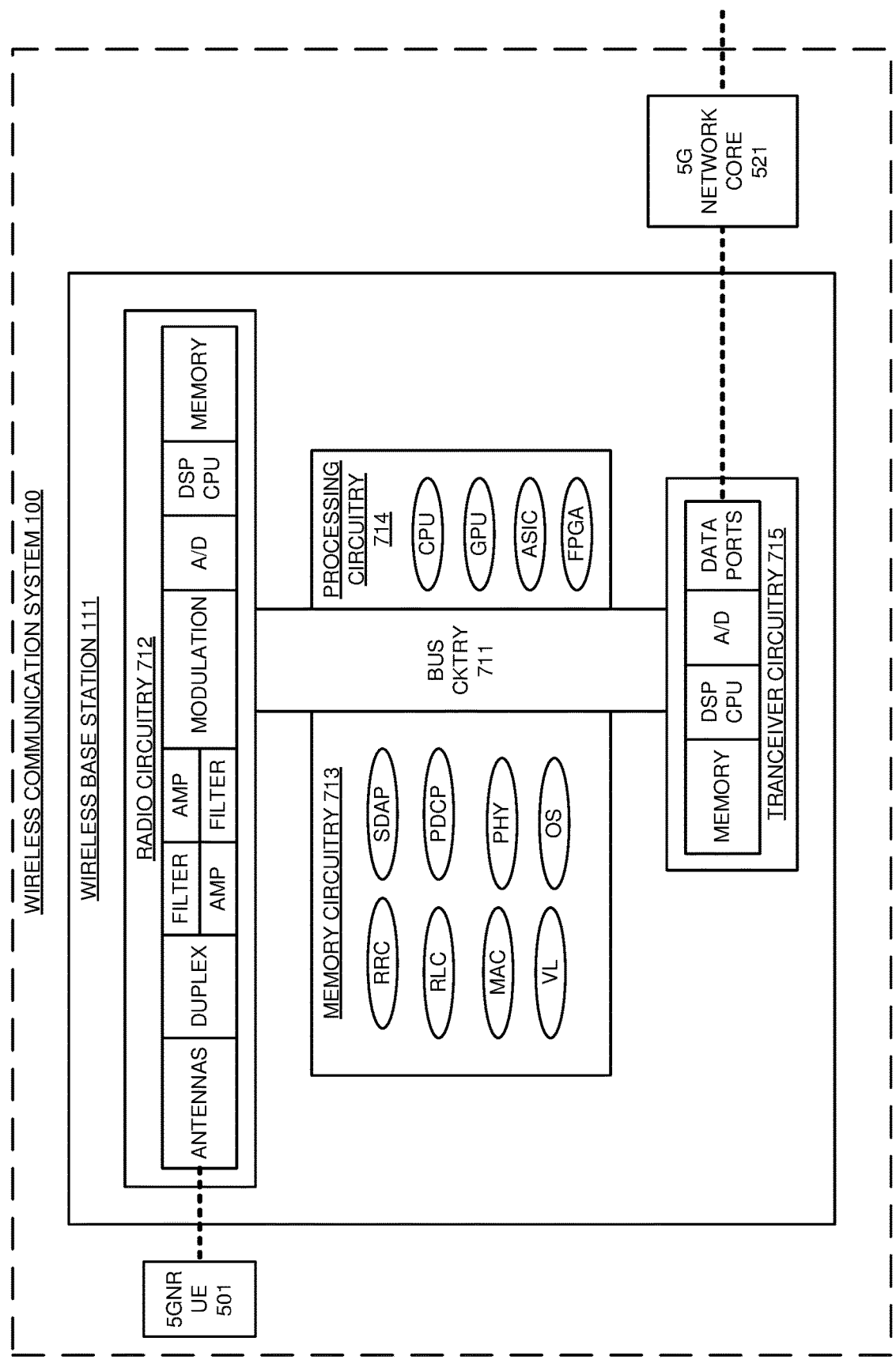
FIG. 7 illustrates a wireless base station that uses the frequency channel and facilitates wireless URLLC service over the frequency channel in the subsector.

FIG. 7 illustrates wireless base station 111 that uses the F1 CH1 in network sector 111A to facilitate wireless URLLC service over F1 CH1 in subsectors 111A1 and 111A3. wireless base stations 311-315 may be similar or wireless base stations 311-315 may differ. wireless base station 111 comprises bus circuitry 711, radio circuitry 712, memory circuitry 713, processing circuitry 714, and transceiver circuitry 715. Bus circuitry 711 couples radio circuitry 712, memory circuitry 713, processing circuitry 714, and transceiver circuitry 715. Memory circuitry 713 comprises volatile and non-volatile memories like flash, disc, tape, and the like. Memory circuitry 713 stores operating systems (OS), virtual layer (VL), network applications (PHY, MAC, RLC, PDCP, RRC, SDAP), and the like. Processing circuitry 714 comprises CPUs, GPUs, ASICs, FPGAs, or some other computer hardware. Transceiver circuitry 715 comprises memory, DSP/CPU, analog-to-digital interface, and data ports. The data ports in transceiver circuitry 715 communicate with 5G network core 521. In some examples, additional radio circuitry is added to wirelessly communicate with 5G network core 521 through another wireless base station, and in these examples, transceiver circuitry 715 could be omitted.

Radio circuitry 712 comprises antennas, duplexers, filters, amplifiers, modulation, analog/digital interfaces, DSP/CPUs, and memory. The antennas exchange wireless signals with wireless 5GNR UE 501. The DSP/CPUs execute firmware/software to drive the exchange of data between the antennas and the radio memory. Processing circuitry 714 drives the exchange of data between the radio memory and memory circuitry 713. Processing circuitry 714 executes the operating systems and network applications to drive the exchange of the data between memory circuitry 713 and transceiver circuitry 715. Transceiver circuitry 715 exchanges the data with network core 714.

The antennas in radio circuitry 712 receive wireless UL signals from 5GNR UE 501 and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data and signaling from the UL signals. The DSP/CPUs store the UL data and signaling in the memory. The DSP/CPUs transfer the recovered UL data and signaling to memory circuitry 713. The network applications process the UL data and signaling in memory circuitry 713. Transceiver circuitry 715 transfers the UL data and signaling to 5G core network 521.

Transceiver circuitry 715 receives DL data and signaling from 5G network core 714 and stores the DL data and signaling in memory circuitry 713. The network applications transfer the DL data and signaling from memory circuitry 713 to radio circuitry 712. In radio circuitry 712, the memory receives the DL data and signaling from memory circuitry 713.

The radio memory hosts geographic data that defines subsectors 111A1 and 111A3. The DSP/CPUs process the geographic data to determine gains and phase shifts per antenna to beamform the DL signals and avoid URLLC subsectors 111A1 and 111A3. The DSP/CPUs transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. Per the DSP/CPUs, the amplifiers apply gains and phase shifts per antenna to beamform the DL signals to avoid the URLLC subsectors. The filters transfer the DL signals through the duplexers to the antennas. The electrical DL signals drive the antennas to emit corresponding wireless DL signals to 5GNR UE 501. Some of the DL signals are beamformed the to avoid the URLLC subsectors.

In wireless base station 111, the network applications drive the exchange of data and signaling between UE 501 and network core 521. The PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The MACs map between the MAC transport channels and MAC logical channels. MAC functions include buffer status, power headroom, channel quality, HARQ, user identification, random access, user scheduling, and QoS. The RLCs map between the MAC logical channels and PDUs. RLC functions comprise ARQ, sequence numbering and resequencing, segmentation and resegmentation. The RLCs exchange data and signaling with the PDCPs. The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like AMFs and/or MMEs to establish and terminate data sessions. The RRCs determine UE locations based on signal strength, angle-of-arrival, UE reports, and the like. The RRCs detach UEs from F1 CH1 if the UEs enter subsector 111A1 or subsector 111A3. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

Wireless base station 111 is depicted as an integrated system for clarity, but base station 111 may be distributed across Distributed Units (DUs) and Common Units (CUs). The connections between the DUs and the CUs are fronthaul circuits, and the connections between the CUs and 5G network core 521 are backhaul circuits. In some examples, the DUs host radio circuitry 712, the CUs host circuitry 711 and 713-715, and the fronthaul circuits comprise Common Public Radio Interface (CPRI) links. In other examples, the DUs host radio circuitry 712 and the DUs/CUs each have a portion of circuitry 711 and 713-715. In these distributed circuitry examples, the DUs typically execute the PHYs and the CUs typically execute the RRCs/SDAPs. The DUs or CUs execute the MACs, RLCs, and PDCPs depending on the network application split.

Figure 8:
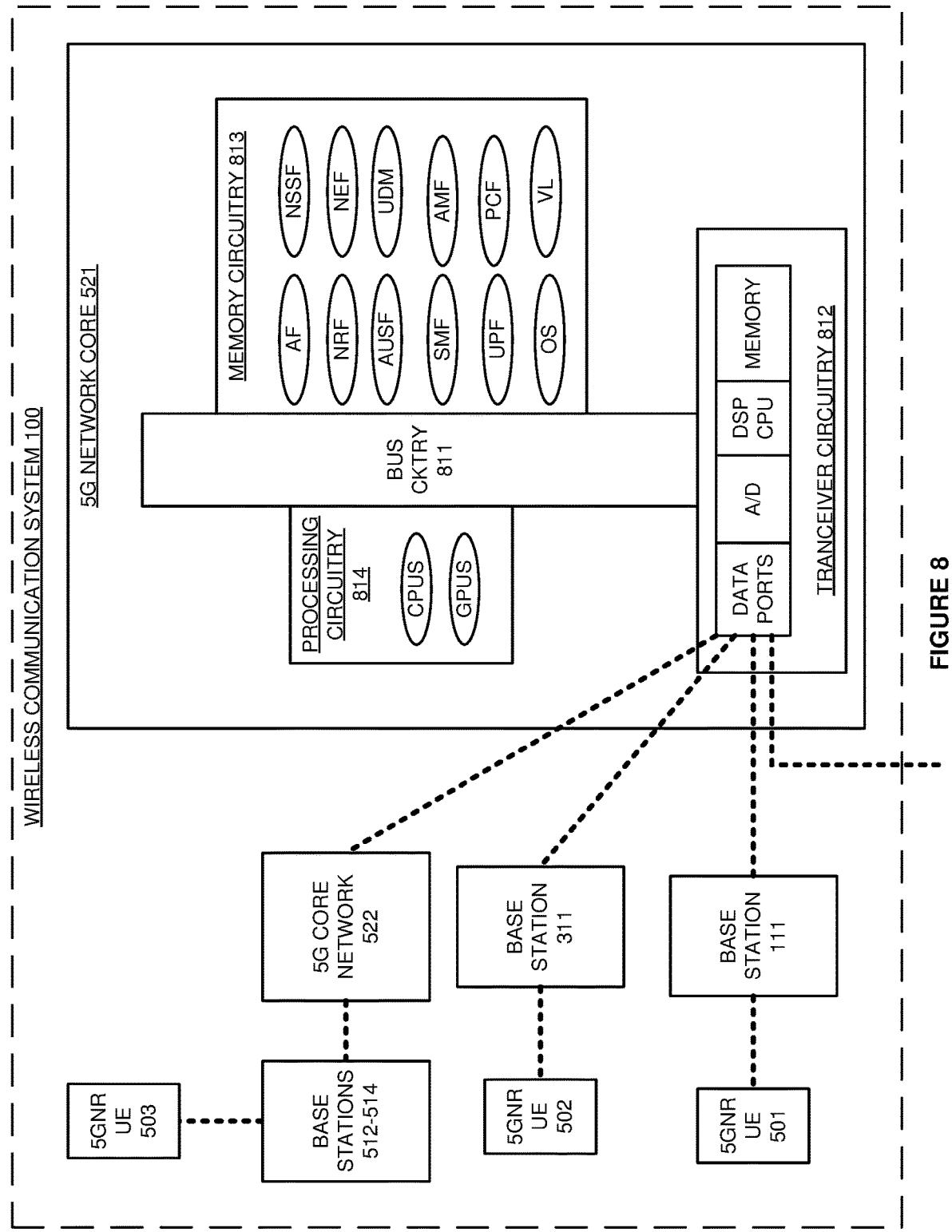
FIG. 8 illustrates a 5G network core that serves the wireless base station and facilitates the wireless URLLC service in the subsector.

FIG. 8 illustrates 5G network core 521 that serves wireless base stations 111 and 311 and facilitates wireless URLLC service in subsectors 111A1 and 111A3. 5G network cores 522-523 could be similar or cores 522-523 may be different. 5G network core 521 comprises bus circuitry 811, transceiver circuitry 812, memory circuitry 813, and processing circuitry 814. Bus circuitry 811 couples transceiver circuitry 812, memory circuitry 813, and processing circuitry 814. Memory circuitry 813 comprises volatile and non-volatile memories like flash, disc, tape, and the like. Memory circuitry 813 stores operating systems, virtual layers, and network element applications. Processing circuitry 814 comprises CPUs, GPUs, and/or some other computer hardware. Processing circuitry 814 executes the operating systems, virtual layers, and network element applications. Transceiver circuitry 815 comprises memory, DSP, CPU, analog-to-digital interface, and data ports. The data ports in transceiver circuitry 815 communicate with wireless base stations 111 and 311, 5G network core 522, and external systems like the internet.

Processing circuitry 814 executes the operating systems to drive the hardware and support the virtual layers. Processing circuitry 814 executes the virtual layers to support the network element applications. The virtual layers comprise virtual switches, virtual machines, hypervisors, and the like. In transceiver circuitry 812, the DSP/CPUs exchange data and signaling with the transceiver memory. Processing circuitry 814 exchanges the data and signaling between the transceiver memory and memory circuitry 813. Processing circuitry 814 executes the network element applications to process the data and signaling in memory circuitry 813.

The network element applications drive the exchange of data and signaling between the external systems and 5GNR access point 111. The network element applications comprise: User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), and the like.

The AMF may support UE location determination for wireless base stations 111 and 311. The AMF may support the detachment and re-attachment of UEs by wireless base stations 111 and 311. The AMF may support UE handovers to new frequencies and channels after detachment from F1 CH1. The AMF manages authentication, authorization, connections, mobility, N1 signaling, ciphering, registration, and security.

The SMF manages session establishment, modification, and release. The UPF routes data packets and forms an anchor point for user mobility. The UPF inspects packets and applies Quality-of-Service. The SMF handles network addressing, Dynamic Host Control Protocol (DHCP), N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/instances. The NSSF selects network slices to serve users and determine slice assistance information and AMFs. The NEF exposes capabilities and events. The NEF securely interacts with external applications and translates internal/external information.

Figure 9:
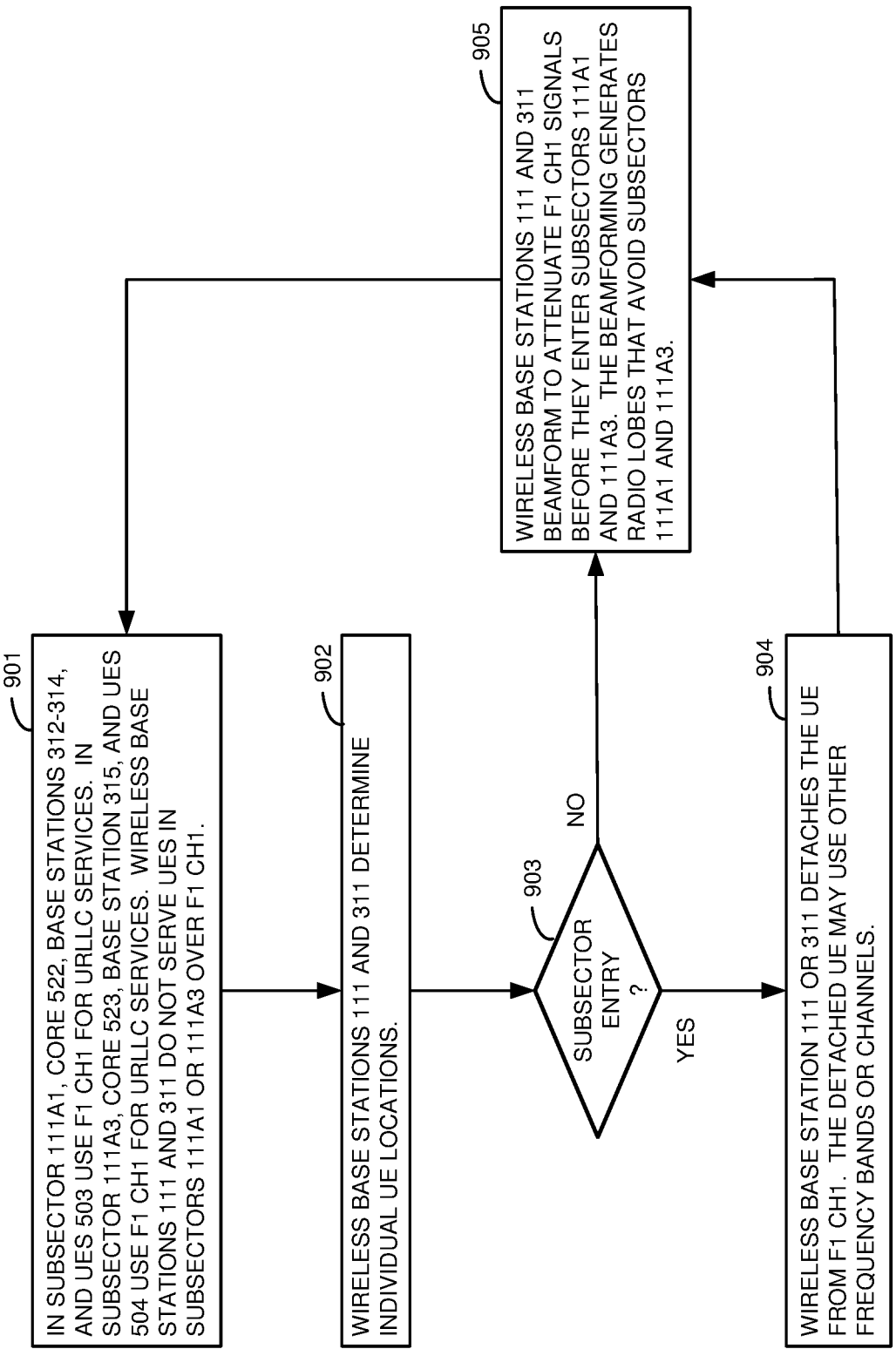
FIG. 9 illustrates the operation of the wireless communication system to serve the wireless network sector over the frequency channel and to facilitate the wireless URLLC service over the frequency channel in the subsector.

FIG. 9 illustrates the operation of the wireless communication 100 system to serve the wireless network sector 111A over F1 CH1 and facilitate wireless URLLC service over the F1 CH1 subsectors 111A1 and 111A3. In subsector 111A1, core 522, base stations 312-314, and UEs 503 use F1 CH1 for URLLC services (901). For example, valves, pumps, and sensors may communicate over F1 CH1 in subsector 111A1 with high reliability and low latency. In subsector 111A3, core 523, base stations 315, and UEs 504 use F1 CH1 for URLLC services. Wireless base stations 111 and 311 do not serve UEs in subsector 111A1 or 111A3 over F1 CH1.

Wireless base stations 111 and 311 determine individual UE locations (902). If a UE enters subsector 111A1 or 111A3 (903), then wireless base station 111 or 311 detaches the UE from F1 CH1 (904). The detached UEs may use other frequency bands or channels. Wireless base stations 111 and 311 beamform to attenuate F1 CH1 signals before they enter subsectors 111A1 and 111A3 (905). The beamforming generates radio lobes that avoid subsectors 111A1 and 111A3. Advantageously, wireless base stations 111 and 311 effectively facilitate URLLC services over efficiently shared frequency bands and channels.

The wireless data network circuitry described above comprises computer hardware and software that form special-purpose wireless network elements that facilitate URLLC services over shared frequency bands. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network elements that facilitate URLLC services over shared frequency bands.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless base station that serves a wireless network sector over a frequency channel to facilitate a wireless Ultra-Reliable Low Latency Communication (URLLC) service over the frequency channel in a subsector of the wireless network sector, the method comprising:

the wireless base station beamforming and transmitting Fifth Generation (5G) signals over the frequency channel to User Equipment (UEs) that are located in the wireless network sector wherein the beamforming attenuates the 5G signals below a signal threshold before the 5G signals enter the subsector;

the wireless base station determining when ones of the UEs enter the subsector;

the wireless base station detaching the ones of the UEs that enter the subsector from the frequency channel, wherein wireless URLLC devices communicate over the frequency channel in the subsector; and the wireless base station wirelessly receiving a URLLC stop signal from a URLLC network in the subsector and responsively stopping the beamforming of the 5G signals to avoid the subsector and stopping the detaching of the UEs that enter the subsector.

2. The method of claim 1 wherein the frequency channel comprises private spectrum licensed from the Federal Communication Commission (FCC).

3. The method of claim 1 wherein the frequency channel comprises a frequency band between 10 megahertz and 100 megahertz wide.

4. The method of claim 1 wherein the sub sector comprises a three dimensional geographic area.

5. The method of claim 1 wherein beamforming the 5G signals comprises generating a radio lobe toward the subsector that attenuates below the interference level before entering the subsector.

6. The method of claim 1 wherein beamforming the 5G signals comprises generating a radio lobe that propagates along a side of the subsector that attenuates below the interference level before entering the subsector.

7. The method of claim 1 wherein beamforming the 5G signals comprises generating a radio lobe that propagates above a top of the subsector that attenuates below the interference level before entering the subsector.

8. The method of claim 1 wherein beamforming the 5G signals comprises generating a radio lobe that propagates below a bottom of the subsector that attenuates below the interference level before entering the subsector.

9. The method of claim 1 further comprising the wireless base station wirelessly receiving a URLLC start signal from a URLLC network in the subsector and wherein the wireless base station beamforming the 5G signals and detaching the UEs that enter the subsector comprises beamforming and detaching in response to the URLLC start signal.

10. A wireless base station to serve a wireless network sector over a frequency channel and facilitate a wireless Ultra-Reliable Low Latency Communication (URLLC) service over the frequency channel in a subsector of the wireless network sector, the wireless base station comprising:

a Fifth Generation (5G) radio configured to beamform and transmit 5G signals over the frequency channel to User Equipment (UEs) that are located in the wireless network sector wherein the beamforming attenuates the 5G signals below a signal threshold before the 5G signals enter the subsector;

a 5G baseband unit configured to determine when ones of the UEs enter the subsector and detach the ones of the UEs that enter the subsector from the frequency channel, wherein wireless URLLC devices are configured to communicate over the frequency channel in the subsector;

the 5G radio configured to receive a URLLC stop signal from a URLLC network in the subsector, and in response, to stop the beamforming of the 5G signals to avoid the subsector; and and the 5G baseband unit configured to process the URLLC stop signal, and in response, to stop the detachment of the UEs that enter the subsector.

11. The wireless base station of claim 10 wherein the frequency channel comprises private spectrum licensed from the Federal Communication Commission (FCC).

12. The wireless base station of claim 10 wherein the frequency channel comprises a frequency band between 10 megahertz and 100 megahertz wide.

13. The wireless base station of claim 10 wherein the subsector comprises a three dimensional geographic area.

14. The wireless base station of claim 10 wherein the 5G radio is configured to beamform the 5G signals to generate a radio lobe toward the subsector that attenuates below the interference level before entering the subsector.

15. The wireless base station of claim 10 wherein the 5G radio is configured to beamform the 5G signals to generate a radio lobe that propagates along a side of the subsector that attenuates below the interference level before entering the subsector.

16. The wireless base station of claim 10 wherein the 5G radio is configured to beamform the 5G signals to generate a radio lobe that propagates above a top of the subsector that attenuates below the interference level before entering the subsector.

17. The wireless base station of claim 10 wherein the 5G radio is configured to beamform the 5G signals to generate a radio lobe that propagates below a bottom of the subsector that attenuates below the interference level before entering the subsector.

18. The wireless base station of claim 10 further comprising:

the 5G radio configured to receive a URLLC start signal from a URLLC network in the subsector, and in response, beamform the 5G signals to avoid the subsector; and the baseband unit is configured to configured to process the URLLC start signal, and in response, detach the UEs that enter the subsector.

* * * * *